No. 871,375. PATENTED NOV. 19, 1907.
J. E. STIEGELMEYER.
AUTOMATIC LOCOMOTIVE CONTROLLER.
APPLICATION FILED FEB. 11, 1907.
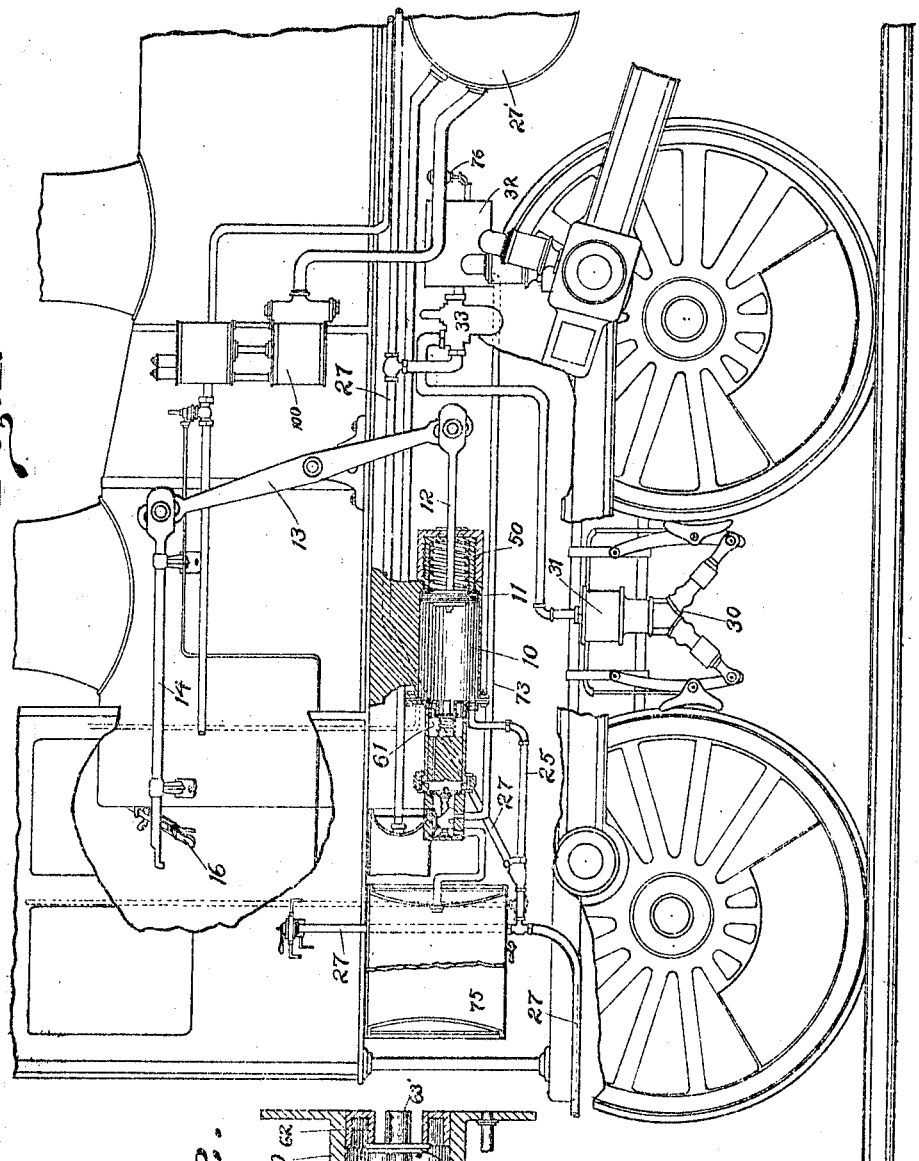
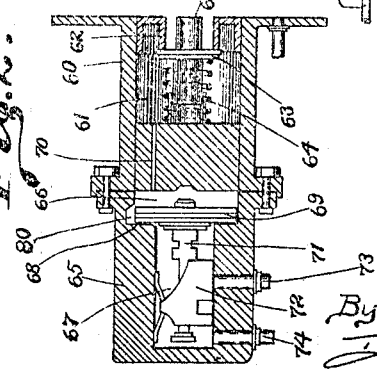
Witnesses
U R Clendening
Thomas W. McMeans
Inventor
John E. Stiegelmeyer
By Bradford Hood
Attorneys

UNITED STATES PATENT OFFICE.

JOHN E. STIEGELMEYER, OF INDIANAPOLIS, INDIANA, ASSIGNOR TO AUTOMATIC TRAIN CONTROL COMPANY, OF INDIANAPOLIS, INDIANA, A CORPORATION OF INDIANA.

AUTOMATIC LOCOMOTIVE-CONTROLLER.

No. 871,375.   Specification of Letters Patent.   Patented Nov. 19, 1907.

Application filed February 11, 1907. Serial No. 356,890.

*To all whom it may concern:*

Be it known that I, JOHN E. STIEGELMEYER, a citizen of the United States, residing at Indianapolis, in the county of Marion and State of Indiana, have invented certain new and useful Improvements in Automatic Locomotive-Controllers, of which the following is a specification.

The object of my invention is to provide an automatically operating means which, in case of a failure of air in the locomotive air brake, will serve to set the brakes on the locomotive.

A further object of my invention is to combine my present mechanism with that forming the subject-matter of my Patent No. 828,344.

The accompanying drawings illustrate my invention;

Figure 1 is a diagramic view of a portion of a locomotive equipped with a structure embodying the invention of my above mentioned patent combined with my present improvement; Fig. 2 a sectional detail, on an enlarged scale, of the automatic valve and mechanism of my present improvement.

In the drawings 10 indicates a pressure cylinder having a piston 11 mounted therein, said piston carrying a piston rod 12 connected by the lever 13 with a slide bar 14 which at its outer end is provided with a finger adapted to automatically shift the throttle lever 16. The train line 27 of the air brake system is connected by a pipe 25 with cylinder 10, said pipe communicating with an automatically opening valve (not shown) in the manner already described in my above mentioned patent. The piston 11 is automatically urged in one direction by spring 50 which operates upon the piston in such direction as to draw slide 14 so as to throw the throttle lever 16 to closed position. Thus far the construction and operation is identical with that shown in the patent already mentioned.

Under normal working conditions, as soon as a proper air pressure has been established in the train line 27 and main reservoir 27′, there will be a corresponding pressure within cylinder 10 which will throw the piston 11 to the position shown in Fig. 1 and hold the same there against the action of spring 50. Upon a reduction of train line pressure for any cause there will be a corresponding reduction of pressure within cylinder 10, and, if the reduction be sufficient, spring 50 will throw piston 11 so as to close the throttle valve, and the brakes 30 of the locomotive will be set by the action of the usual piston within the brake cylinder 31, by reason of the pressure coming into said cylinder from the usual auxiliary reservoir 32 through the usual triple valve 33. If, however, there be a failure of air in the auxiliary reservoir 32 there will be no action of the brakes on the locomotive and it is for this purpose that my present structure is designed. Instead of a solid head for one end of cylinder 10, I provide a head 60 having a chamber 61 formed therein. Chamber 61 is closed adjacent the cylinder 10 by an annular valve seat 62 and a valve 63 seated thereon, said valve 63 opening outwardly relative to the cylinder 10, and being held upon its seat by a suitable spring 64. Valve 63 is provided at its cylinder end with a pin 63′ adapted to be engaged by a portion of the piston 11 when said piston is moved to the initial end of cylinder 10. Secured to the outer end of head 60 is a valve casing 65 having two chambers 66 and 67 formed therein, a valve seat 68 lying between the two chambers in position to receive a piston valve 69 which lies within the chamber 66. A small passage 70 forms a restricted communication between chambers 61 and 66. Valve 69 is provided with a stem 71 which lies within chamber 67 and carries a valve 72 adapted to be moved across the inner end of a pipe 73 which forms a communication between chamber 67 and the auxiliary reservoir 32 of the locomotive. A pipe 74 forms a communication between chamber 67 and a supplemental reservoir 75 carried by the locomotive. A safety valve 76 is provided on the auxiliary reservoir 32 so that, if there be an abnormal pressure within the auxiliary reservoir 32 it may escape to the outer air.

The operation is as follows: With the parts in the position shown in the drawings, air entering the main reservoir 27′ from the pump 100 passes in the usual manner through the triple valve into the auxiliary reservoir 32 and also passes through pipe 25 into cylinder 10; from thence past valve 63, against the action of spring 64 into chamber 61, thence through passage 70, past valve 69, leaking by said valve through the restricted passage 80 into chamber 67, and thence through pipe 74 into the supplemental reservoir 75, until the pressures are equalized in the various chambers and reservoirs, at which time spring 64 will serve to seat valve 63 upon its seat 62. Thereupon, upon any ordinary reduction of train line pressure, valve 63 will serve to retain the pressure within the supplemental reservoir 75 and valve 72 prevents any communication between chamber 67 (and therefore supplemental reservoir 75) and the auxiliary reservoir 32, and there will be the ordinary action of the brakes 30. If, however, there be an abnormal reduction of pressure within cylinder 10, piston 11 will move to the initial end of said cylinder and will engage pin 63' thereby unseating valve 63 so that the pressure within chambers 61 and 66 may escape into the train line. Thereupon, the excess pressure in chamber 67 causes valve 69 to move to the right (in Fig. 3) so as to shift valve 72 from the inner end of pipe 73 so as to establish free communication between said pipe and chamber 67. Thereupon, the pressure from the supplemental reservoir 75 passes through pipes 74 and 73 to the auxiliary reservoir 32 and thence through the triple valve 33, in the usual manner, to the brake cylinder 31.

I claim as my invention:

1. In a locomotive controller, the combination with a throttle valve, means for automatically closing the same, and air brake mechanism comprising a brake cylinder and pressure means for normally actuating the brake mechanism, of a source of supplemental pressure for also actuating the brake mechanism, and means controlled by the throttle closing means for connecting the supplemental pressure container with the brake mechanism.

2. In a locomotive controller, the combination of a throttle valve; an air-brake system comprising the brakes, the brake cylinder, pressure containing means, and means for admitting from said container to the brake-cylinder; a supplemental pressure container, a cylinder connected to the brake system, a piston in said cylinder, connections between said piston and the throttle valve for automatically closing said valve, and means controlled by said piston for automatically connecting the supplemental pressure container with the brake cylinder.

3. In a locomotive controller, the combination of a throttle valve; an air-brake system comprising the brakes, the brake cylinder, pressure containing means, and means for admitting from said container to the brake-cylinder; a supplemental pressure container, a cylinder connected to the brake system, a piston in said cylinder, connections between said piston and the throttle valve for automatically closing said valve, and pressure controlled means controlled by said piston for automatically connecting the supplemental pressure container with the brake cylinder.

4. In a locomotive controller, the combination of a throttle valve; an air-brake system comprising the brakes, the brake cylinder, pressure containing means, and means for admitting from said container to the brake-cylinder; a supplemental pressure container, a cylinder connected to the brake system, a piston in said cylinder, connections between said piston and the throttle valve for automatically closing said valve, a valve normally closing communication between the supplemental pressure container and the brake cylinder, a balanced valve for moving said valve, and a valve controlled by the movement of the piston for retaining or releasing the pressure upon one side of said balanced valve.

5. In a locomotive controller, the combination, with a throttle valve and means for automatically closing same, of air brake mechanism comprising a brake cylinder, an air brake train line, a reservoir, and a triple valve between said reservoir and brake cylinder, of a supplemental reservoir communicating with the first-mentioned reservoir, and means controlled by the throttle valve closing means for controlling communication between the supplemental reservoir and first-mentioned reservoir.

6. In a locomotive controller, the combination of a throttle valve, an air brake system comprising the brakes, the brake cylinder, the pressure reservoir, a triple valve between said pressure reservoir and brake cylinder, a supplemental reservoir, a connection between said supplemental reservoir and first-mentioned reservoir, a valve controlling said connection, a balanced valve controlling said first-mentioned valve, a cylinder communicating with the air brake system, a piston mounted therein, intermediate connections between said piston and the throttle valve for closing the same, and a valve controlled by the movement of said piston for retaining or releasing the pressure upon one side of the balanced valve.

7. In a locomotive controller, the combination of the brakes, the brake cylinder for operating the same, a pressure means for operating said brakes, a pressure container, a triple valve between said pressure container and the brake cylinder, a supplemental pressure container having connections with the brake cylinder, the first-mentioned reservoir, a cylinder communicating with the air brake system, a piston mounted in said cylinder, intermediate connections between said piston and the throttle valve for closing the same, a valve for controlling communication between the two reservoirs, a piston valve for operating said last-mentioned valve, said piston valve being mounted in a chamber communicating on one side with a supplemental reservoir and on the other side with the air brake system, with a leakage passage around said valve, a normally closed valve between said piston valve and the air brake system, and means controlled by the piston for operating said last-mentioned valve, all substantially as and for the purpose set forth.

8. In a locomotive controller, the combination of the brakes, the brake cylinder for operating the same, a pressure container; a triple valve between said pressure container and the brake cylinder, a supplemental pressure container having connections with the first-mentioned reservoir, a cylinder communicating with the air brake system, a piston mounted in said cylinder, intermediate connections between said piston and the throttle valve for closing the same, a valve for controlling communication between the two reservoirs, a piston valve for operating said last-mentioned valve, said piston valve being mounted in a chamber communicating on one side with a supplemental reservoir and on the other side with the air brake system, with a leakage passage around said valve, a normally closed valve between said piston valve and the air brake system, and means controlled by the piston for operating said last-mentioned valve, all substantially as and for the purpose set forth.

9. In a locomotive controller, the combination of the brakes, the brake cylinder for operating the same, a pressure means for operating said brakes, a supplemental pressure container having connections with the brake cylinder, a cylinder communicating with the air brake system, a piston mounted in said cylinder, intermediate connections between said piston and the throttle valve for closing the same, a valve for controlling communication between the two reservoirs, a piston valve for operating said last-mentioned valve, said piston valve being mounted in a chamber communicating on one side with a supplemental reservoir and on the other side with the air brake system, with a leakage passage around said valve, a normally closed valve between said piston valve and the air brake system, and means controlled by the piston for operating said last-mentioned valve, all substantially as and for the purpose set forth.

10. In a locomotive controller, the combination of the brakes, the brake cylinder for operating the same, a supplemental pressure container having connections with a cylinder communicating with the air brake system, a piston mounted in said cylinder, intermediate connections between said piston and the throttle valve for closing the same, a valve for controlling communication between the two reservoirs, a piston valve for operating said last mentioned valve, said piston valve being mounted in a chamber communicating on one side with a supplemental reservoir and on the other side with the air brake system, with a leakage passage around said valve, a normally closed valve between said piston valve and the air brake system, and means controlled by the piston for operating said last-mentioned valve, all substantially as and for the purpose set forth.

In witness whereof, I, have hereunto set my hand and seal at Indianapolis, Indiana, this fifth day of February, A. D. one thousand nine hundred and seven.

JOHN E. STIEGELMEYER. [L. S.]

Witnesses:
 ARTHUR M. HOOD,
 THOMAS W. McMEANS.